C. A. THOMPSON.
Car-Trucks.

No. 149,693.              Patented April 14, 1874.

Witnesses
Chas. H. Smith
Geo. T. Pinckney

Inventor
Charles A. Thompson
per Lemuel W. Serrell
(Atty)

UNITED STATES PATENT OFFICE.

CHARLES A. THOMPSON, OF FLUSHING, NEW YORK.

IMPROVEMENT IN CAR-TRUCKS.

Specification forming part of Letters Patent No. 149,693, dated April 14, 1874; application filed February 21, 1874.

*To all whom it may concern:*

Be it known that I, CHARLES A. THOMPSON, of Flushing, in the county of Queens and State of New York, have invented an Improvement in Connecting Trucks to Cars, and the following is a specification of the same:

Trucks for railroad-cars have been provided with safety-chains connecting them with the body of the car, which chains are loose to allow the car to swing upon the king-bolt, but kept the truck and car together in case of accidents, such as the wheels leaving the track, or the breaking of the king-bolt. These chains are objectionable on account of the noise they make when the cars are in motion; they also wear out rapidly from the dust and constant motion.

My invention consists in rigid loops applied upon the car-truck and interlocking with similar loops upon the bottom of the car, the loops being long enough to allow the usual movements of the car upon the king-bolt, but preventing the truck and car becoming separated in case of accident, and limiting the extent of turning motion, so that the truck cannot swing crosswise to the car.

Figure 1:
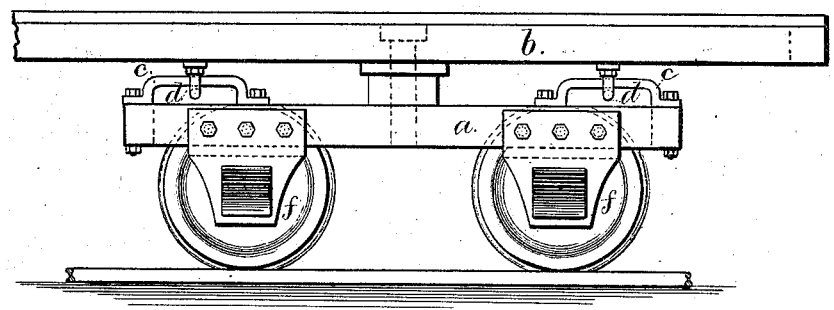
Figure 2:
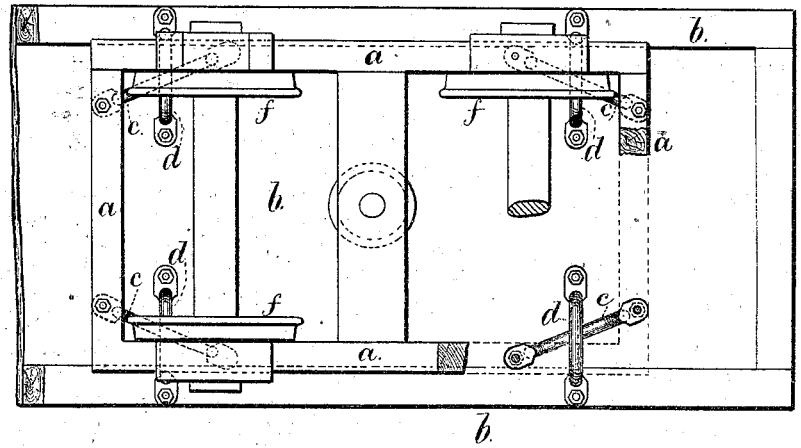

In the drawing, Figure 1 represents a side elevation of a car-truck with a portion of a car, and Fig. 2 is an inverted plan of the truck with part of the frame removed to show the connecting-loops.

$a$ is the truck-frame, and $b$ the body of the car. $f$ are the wheels. $c\ c$ are the loops upon the truck, and $d\ d$ similar loops upon the bottom of the car. These loops are of wrought-iron, and are bolted rigidly, and each one, $c$, upon the truck-frame passes over or interlocks with a similar one, $d$, upon the car; but they are long enough to prevent any contact with each other, while the truck and car retain their proper or usual positions, but in case of accident these loops firmly connect the truck to the car, and limit the amount of turning motion. I prefer four pairs of these loops, one at each corner of the truck-frame, which insure the truck remaining nearly parallel with the track in case of accident, and if the king-bolt is broken or wrenched from its place, they prevent the car being separated from the truck. The loops $d$ depending from the frame or bottom $b$ of the engine or car may pass around the truck-frame, so as to retain the same, but allow of the aforesaid turning motion.

I claim as my invention—

1. The loop $c$ upon the truck, interlocking with similar loops upon the car-body, substantially as and for the purposes set forth.

2. The loops $d$ below the frame or bottom of the car or engine, in combination with the truck-frame, substantially as and for the purposes set forth.

Signed by me this 17th day of February, A. D. 1874.

CHARLES A. THOMPSON.

Witnesses:
GEO. T. PINCKNEY,
CHAS. H. SMITH.